INVENTOR.
Peter G. Salgado
James F. Torbert
BY

United States Patent Office 3,527,098
Patented Sept. 8, 1970

3,527,098
GROOVED MELT WIRES
Peter G. Salgado and James F. Torbert, Los Alamos, N. Mex., assignors to the United States of America as represented by the United States Atomic Energy Commission
Filed Feb. 25, 1969, Ser. No. 802,011
Int. Cl. G01k 11/06
U.S. Cl. 73—358                     6 Claims

ABSTRACT OF THE DISCLOSURE

An improved melt wire for measuring temperature. A wire with a circumferential groove and composed of material that melts at a known temperature is encapsulated in a quartz or graphite tube. By noting whether or not the wire has melted, it is possible to determine whether the temperature has been reached.

---

The invention described herein was made in the course, of, or under, a contract with the U.S. Atomic Energy Commission.

This invention relates to temperature measurement. More specifically, this invention relates to a device that will indicate whether a predetermined temperature has been reached. By use of a number of these devices with their melting points in a sequence, it is possible to measure temperatures under conditions that render more conventional temperature measuring means inadequate.

Under certain conditions such as extremely high temperature, it is impossible to use lead wires or conduits from the temperature measuring instrument to an accessible point. This eliminates use of a great number of the temperature measuring instruments now in existence. If the conditions are such that the environment to be measured must be enclosed, as in a shielded nuclear reactor, additional temperature measuring instruments are eliminated and if the object to be measured must be in motion, most of the remaining temperature measuring instruments are eliminated.

Prior art devices that overcome the above-mentioned difficulties include the following: temperature-sensitive paints that indicate temperature by color changes; discs and rings that indicate temperature by a change in size; melt powders that indicate temperature by a change in state; and pellets, wires and cones that indicate temperature by a change in shape. The paints, discs, rings and melt powders have a number of disadvantages. The temperature range that can be measured is too narrow with some, environmental conditions change the characteristics of some and accuracy is poor with others. Perhaps the most important disadvantage with these devices is that they are not adaptable to radiographic techniques.

Of the devices that depend upon a change in shape to indicate temperature, i.e., pellets, wires and cones, wires appear to be the most promising. It is difficult to detect changes in shape of the pellets and cones with the degree of accuracy required for precise temperature measurement.

The change in shape of the device is a result of melting and the key to success of the device is in detecting the first signs of melt. Without further refining, wires have been shown to lack the desired degree of accuracy. Even though the wires are heated above their melting point, they do not readily show indication of melt. It is postulated that an oxide film develops on the surface of the wire and the flow of molten metal is inhibited. Because the surface-area-to-volume ratio increases as the wire diameter decreases, use of fine wires only compounds the difficulty by increasing the inhibiting effect of the oxide film. Another difficulty encountered is that minor changes in shape are hard to detect.

The present invention gives a high degree of precision by enabling melt detection when the device has been raised to only a few degrees above its melting point. The wire is enclosed in an evacuated quartz or graphite tube to remove the oxide film effect and a circumferential groove is provided in the wire so that the first signs of melting may be detected. The choice of materials is, of course, dependent upon the conditions that will be encountered.

It is therefore an object of this invention to provide a device that will give greater accuracy in temperature measurement by enabling greater precision in melt detection. It is a further object of this invention to provide a device that will enable greater precision in detecting melt by radiography.

The above and other objects and advantages will become apparent from a consideration of the following description when taken in conjunction with the accompany drawings wherein.

Figure 1:
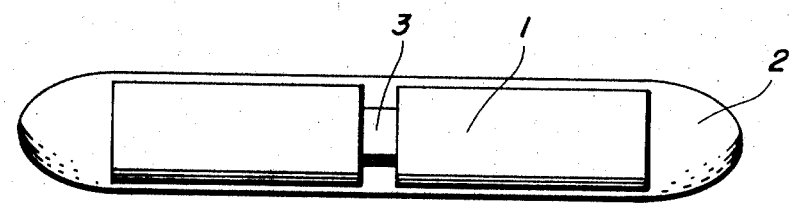
FIG. 1 shows the grooved melt wire encapsulated in a quartz tube before melting.
Figure 2:
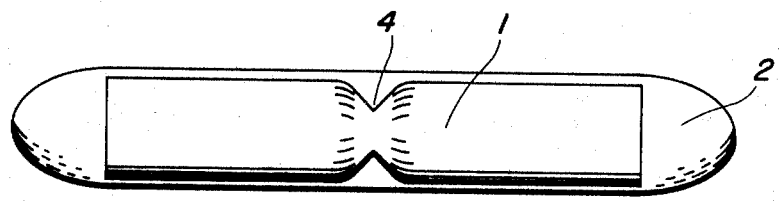
FIG. 2 shows the grooved melt wire encapsulated in a quartz tube after melting.
Figure 4:
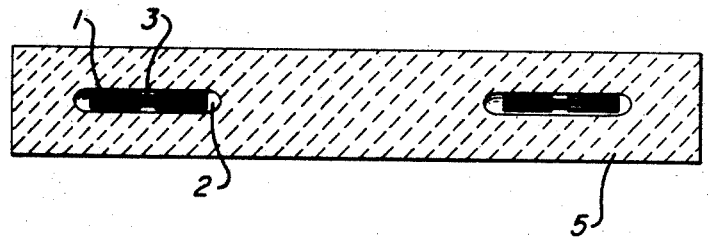
FIG. 4 shows a sectional view of FIG. 3 taken along the line 4—4.
Figure 3:
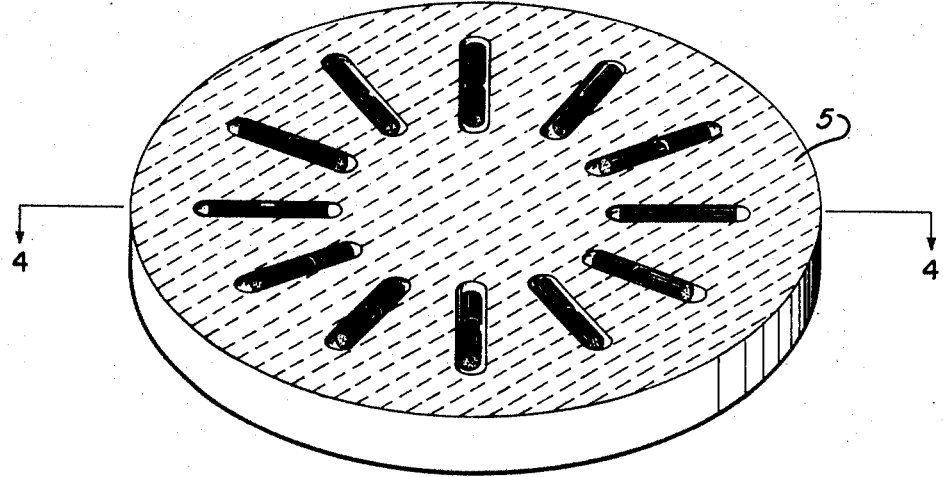
FIG. 3 shows a partial cross-sectional view of the grooved melt wire encapsulated in a graphite tube and embedded in a graphite disc.

The device shown in FIG. 1 was constructed by maching a one-one-hundredth-inch-wide by a one-one-hundredth-inch-deep circumferential groove 3 into a four-one-hundredth-inch melt wire 1 one-quarter-inch long. The groove was machined midway between the ends of the wires. The grooved wire 1 was then sealed in an evacuated quartz tube 2. Next the device was heated above its melting temperature and the result is shown in FIG. 2.

Evidence that melt occurred is clearly indicated by the change in shape of the groove 4. The corners have become rounded and material has built up in the bottom of the groove. The change in shape of the groove is much easier to detect than when an ordinary wire is used. Ability to detect the change in shape is more important when radiographic techniques are used than when the wires are examined visually; however, the addition of the groove is significant in both cases. The position of the groove is not limited to the middle of the wire and there may be advantages in placing the groove at other locations along the wire. For example, in some instances an identification number may be included on the wire and the groove placed near one end. It may also be beneficial to include a multiplicity of grooves on a single wire. In addition, materials other than quartz may be used for the capsule, graphite being a notable example.

To determine the temperature within an environment such as a nuclear reactor, a number of encapsulated wires are placed in a graphite disc. The wires are chosen so that their melting points form a sequence. For example, twelve wires could be used with the melting point of the first wire being 100° C., the melting point of the second wire being 200° C., and each succeeding wire having a melting point 100° C. higher than the previous one with the last wire having a melting point of 1200° C. The graphie disc containing the encapsulated wires is placed in the reactor and when the temperature is to be measured, a radiograph is taken of the disc. The plate is developed and examined to see how many of the encapsulated wires have melted. The temperature of the reactor will lie within the 100° C. range between two consecutive melting points and can be determined by detecting the first wire in the sequence that did not melt. If it is necessary to determine the reactor temperature with greater accuracy, more wires may be used with the range between melting points being less.

What is claimed is:

1. A device for measuring temperature comprising an evacuated tube, said tube being composed of materials selected from the class consisting of quartz and graphite, and a wire encapsulated in said tube, said wire composed of material whose melting point is known, each tube being contained in a graphite disc, and said disc being radiographed to determine the temperature to which the wires were exposed.

2. The device of claim 1 wherein the wire is encapsulated in a graphite tube.

3. The device of claim 1 wherein the wire has a circumferential groove.

4. The device of claim 3 wherein the circumferential groove is located midway between the ends of the wire.

5. The device of claim 3 wherein a multiplicity of circumferential grooves are located along the wire.

6. The device of claim 3 including a multiplicity of encapsulated wires with the melting points of the wires forming a sequence.

References Cited

UNITED STATES PATENTS

| | | | |
|---|---|---|---|
| 688,562 | 12/1901 | Watkin | 73—358 |
| 2,359,794 | 10/1944 | Rogers | 73—358 |

LOUIS R. PRINCE, Primary Examiner

F. SHOON, Assistant Examiner